US008000191B2

(12) United States Patent
Liu

(10) Patent No.: US 8,000,191 B2
(45) Date of Patent: Aug. 16, 2011

(54) METHOD FOR COLLECTING TEXT FROM MUSICAL DISC

(75) Inventor: Chun-Lung Liu, Hsin-Tien (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1589 days.

(21) Appl. No.: 11/330,375

(22) Filed: Jan. 11, 2006

(65) Prior Publication Data

US 2007/0174540 A1    Jul. 26, 2007

(51) Int. Cl.
*G06F 12/00* (2006.01)
(52) U.S. Cl. .................. 369/47.21; 369/30.03; 711/100
(58) Field of Classification Search ............... 369/47.21, 369/30.03; 455/63.1, 59; 711/100
See application file for complete search history.

(56) References Cited

U.S. PATENT DOCUMENTS 6,272,085 B1    8/2001  Maeda
7,123,815 B2   10/2006  Matsui et al. .................... 386/94

FOREIGN PATENT DOCUMENTS

JP    2002184117 A    6/2002

OTHER PUBLICATIONS

Japanese Patent Publication No. JP 2000021090 A, Jan. 21, 2000, 8 pages.

Chinese Patent Publication No. CN 1404059 A, Mar. 19, 2003, 13 pages.

*Primary Examiner* — Hoa T Nguyen
*Assistant Examiner* — Andrew J Sasinowski
(74) *Attorney, Agent, or Firm* — Alan Kamrath; Kamrath & Associates PA

(57) ABSTRACT

A method reads text data from a musical disc in a disc drive. The musical disc includes a plurality of blocks each including a plurality of packs. Each pack is given a block number and a sequence number and written to a ring buffer of a disc drive including a first memory and a second memory. The method includes setting a target pack, reading packs from the musical disc, giving them provisional numbers in sequence and writing them to the first memory, providing a target provisional number, reading a pack according to the target provisional number from the first memory, reading the block number and sequence number of the pack given the target provisional number, determining whether the pack with the target provisional number is the target pack, writing the pack with the target provisional number to the second memory if the pack with the target provisional number is the target pack, determining whether the maximum sequence number of the current block is known if the pack with the target provisional number is not the target pack, skipping remaining packs of the current block including the pack with the target provisional number and returning to reading the plurality of packs from the musical disc if the maximum sequence number of the current block is known, and increasing the current provisional number by an increment and returning to reading the pack according to the target provisional number if the maximum sequence number of the current block is not known.

13 Claims, 3 Drawing Sheets

METHOD FOR COLLECTING TEXT FROM MUSICAL DISC

BACKGROUND OF INVENTION

1. Field of Invention

The present invention relates to a musical disc and, more particularly, to a method for collecting text from a musical disc.

2. Related Prior Art

Discs such as CD and DVD are popular media for storage of data and, particularly so, for storage of music. As known, a musical disc records text data in addition to audio data. For example, the audio data is read for reproduction of the songs, and the text data is read for reproduction of the titles, author(s) and possibly lyrics of the songs. The musical disc includes a lead-in area divided into a plurality of sub-areas. Some of the sub-areas repeatedly record a group, i.e., each records a copy of the group. Since the musical disc may be sold in many countries, the group may include up to eight blocks each corresponding to a different language. Each block includes several packs each corresponding to a different song. In use, the musical disc is put in a player. The player reads a complete copy of the group before it reads the audio data, i.e., every pack of every block. The musical disc is, however, often manufactured with flaws, and it often happens that the player cannot read every pack of every block of any group. Conventionally, when it happens, the player moves from the current pack of the current group to the corresponding pack of the next group, one pack at a time. This is time-consuming. Moreover, the player cannot complete reading the group if no block is flawless, i.e., the musical disc has to be abandoned.

The present invention is therefore intended to obviate or at least alleviate the problems encountered in the prior art.

SUMMARY OF INVENTION

It is the primary objective of the present invention to provide a method for reading text data from a musical disc repeatedly recording a group including a plurality of blocks each including a plurality of packs. Each pack is given a block number and a sequence number and written to a ring buffer including a first memory and a second memory.

According to the present invention, the method includes setting a target pack, reading packs from the musical disc, giving them provisional numbers in sequence and writing them to the first memory, providing a target provisional number, reading a pack according to the target provisional number from the first memory, reading the block number and sequence number of the pack given the target provisional number, determining whether the pack with the target provisional number is the target pack, writing the pack with the target provisional number to the second memory if the pack with the target provisional number is the target pack, determining whether the maximum sequence number of the current block is known if the pack with the target provisional number is not the target pack, increasing the target provisional number by one plus the maximum sequence number minus the sequence number of the pack with the target provisional number and returning to reading the pack according to the target provisional number from the first memory if the maximum sequence number of the current block is known, and increasing the current provisional number by an increment and returning to reading the pack according to the target provisional number.

Other objects, advantages, and novel features of the invention will become more apparent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF PREFERRED EMBODIMENT

A musical disc (not shown) records audio data. In fact, the musical disc may record text data in addition to the audio data. If the musical disc records text data in addition to the audio data, it records the text data in its lead-in area. The lead-in area is divided into sub-areas. Some of the sub-areas (generally in the order of thousand) are called "text-specific sub-areas", each for recording a copy ("group") of the text data. That is, the text-specific sub-areas ideally record identical groups. Each group includes a first amount N1 of blocks (currently up to eight blocks) each corresponding to a language. The blocks are numbered. Each block includes a second amount N2 of packs. The packs are also numbered. One or more of the packs record information related to a song. Each pack is given a sequence number and a block number. For example, a pack given a sequence number of "0" and a block number of "0" is the first pack of the first block of any group. Each pack includes a third number N3 of bytes.

In use, the musical disc is put in a disc drive (not shown) connected with a host computer (not shown). The disc drive includes a ring buffer consisting of a first memory (not shown) and a second memory (not shown). The first and second memories may be made as two individual chips or merged into a single chip and divided into two areas.

The disc drive and/or the host computer may adopt a method for collecting text from a musical disc according to the preferred embodiment of the present invention that will be described referring to FIGS. 1~4. The disc drive, the host computer and the method together will be called "system" hereinafter.

Figure 1:
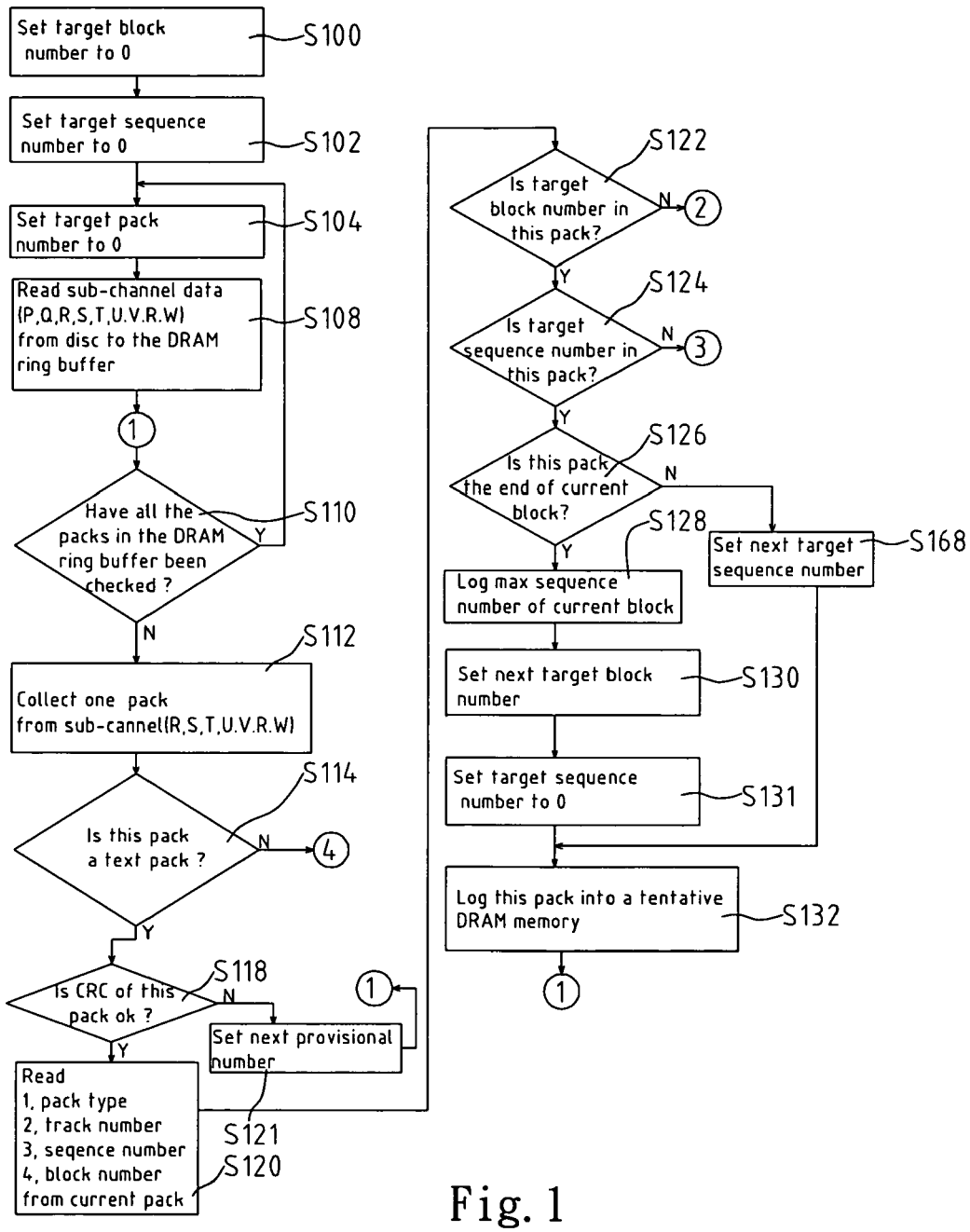
FIG. 1 is a flow chart of a method for collecting text data from a musical disc according to the present invention.

Referring to FIG. 1, at step S100, the system sets a target block number to "0" for comparison with the block numbers of packs to be read from the lead-in area and written to the first memory.

At step S102, the system sets a target sequence number to "0" for comparison with the sequence numbers of packs to be read from the lead-in area and written to the first memory.

At step S104, the system sets a provisional number to "0".

At step S108, the system reads data, pack by pack, from the lead-in area and writes them to the first memory. Each pack is given a provisional number when it is recorded in the first memory. For example, the first pack is given a provisional number of "0", the second pack is given a provisional number of "1", and so on. The pack with the provisional number of "0" is likely not the pack given the sequence number of "0"

and the block number of "0". At this instant, the numbers N1 and N2 are not known by the system.

At step S110, the system determines whether it has checked all the packs in the first memory. If the answer is "YES", the system goes to step S104. Thus, the first memory is refreshed. That is, the packs are removed from the first memory, and other packs are written to the first memory. If the answer is "NO", the system goes to step S112.

At step S112, the system reads a pack ("current pack") from the first memory. Then, the system goes to step S114.

At step S114, the system determines whether the current pack is a text pack via determining whether all its bytes add up to be "0". If the answer is "YES", the system goes to step S118. If the answer is "NO", the system goes to step S134.

Figure 2:
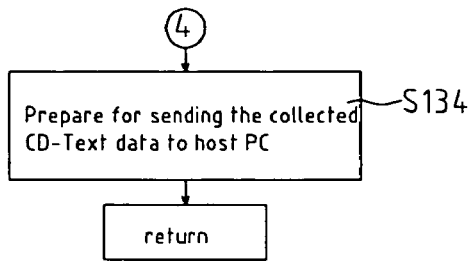
FIG. 2 is a flow chart of a subroutine of the method shown in FIG. 1.

Referring to FIG. 2, at step S134, the system prepares for transmission of the data from the second memory to the host computer. Then, the system stops.

At step S118, the system determines whether the current pack is correct. This is done via determining whether its cyclic redundancy check ("CRC") value is ok. If the answer is "YES", the system goes to step S120. If the answer is "NO", the system goes to step S121.

At step S121, the system sets a next provisional number via adding one to the current provisional number. Then, the system goes to step S110. Thus, the system processes a next pack.

At step S120, the system reads the pack type, the sequence number and the block number of the current pack since the current pack is correct.

At step S122, the system determines whether the block number of the current pack is equal to the target block number. If the answer is "YES", the system goes to step S124. If the answer is "NO", the system goes to step S136.

Figure 3:
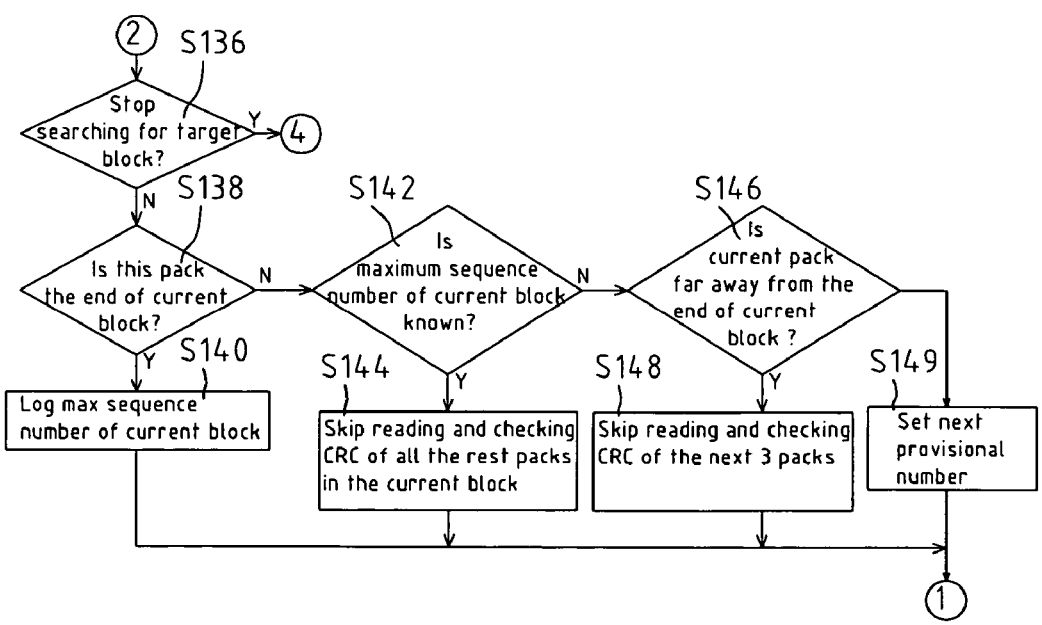
FIG. 3 is a flow chart of a subroutine of the method shown in FIG. 1.

Referring to FIG. 3, at step S136, the system determines whether it should stop searching for the target block. To this end, a counter is used for calculating how many times the system goes to step S136, and a limit is set. If the number of times the system goes to step S136 reaches the limit, it is determined that the searching for the target block should be stopped. If the answer is "YES", the system goes to step S134. If the answer is "NO", the system goes to step S138.

At step S138, the system determines whether the current pack is the end of the current block. If the answer is "YES", the system goes to step S140. If the answer is "NO", the system goes to step S142.

At step S140, the system records the sequence number of the current pack as the maximum sequence number, i.e., the second amount N2. Then, the system goes to step S110.

At step S142, the system determines whether the maximum sequence number N2 of the current block is known. If the answer is "YES", the system goes to step S144. If the answer is "NO", the system goes to step S146.

At step S144, the system skips all of the rest of the packs in the current block.

At step S146, the system determines whether the current pack is far from the end of the current block. This is done via comparing the pack type of the current pack with a predetermined value, since the last three packs of each block are of predetermined pack types. If the answer is "YES", the system goes to step S148. If the answer is "NO", the system goes to step S149.

At step S149, the system sets a next provisional number via adding one to the current provisional number. Then, the system goes to step S110.

At step S148, the system skips the next three packs. Then, the system goes to step S110.

At step S124, the system determines whether the sequence number of the current pack is equal to the target sequence number. If the answer is "YES", the system goes to step S126. If the answer is "NO", the system goes to step S150.

Figure 4:
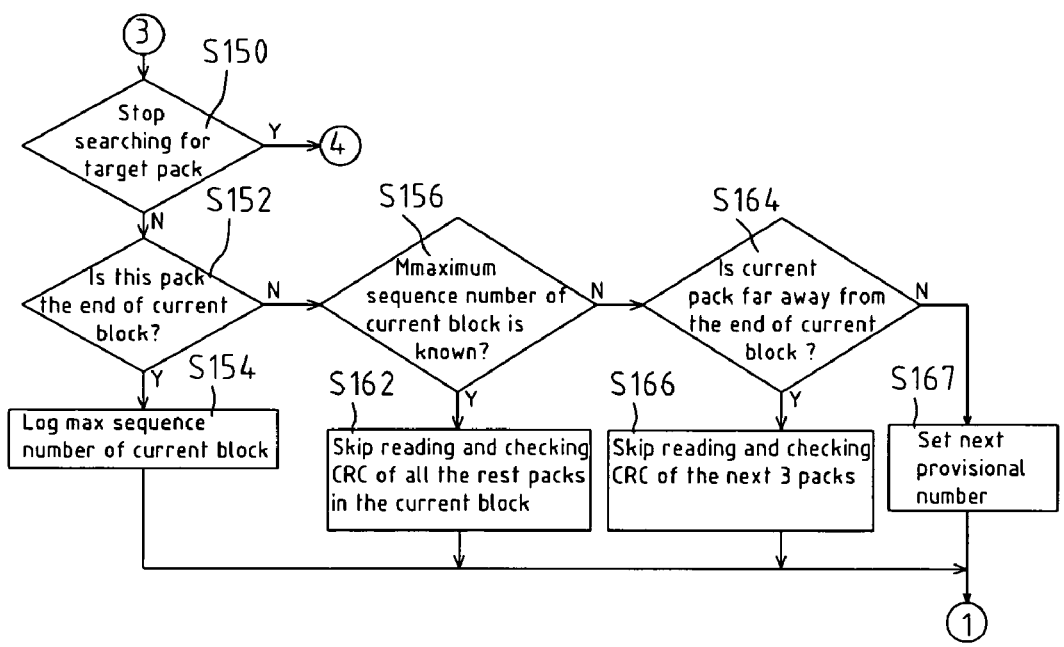
FIG. 4 is a flow chart of a subroutine of the method shown in FIG. 1.

Referring to FIG. 4, at step S150, the system determines whether it should stop searching for the target pack. If the answer is "YES", the system goes to step S134. If the answer is "NO", the system goes to step 5152. To this end, a counter is used for calculating how many times the system goes to step S150, and a limit is set. If the number of times the system goes to step S150 reaches the limit, it is determined that the searching for the target pack should be stopped.

At step S152, the system determines whether the current pack is the end of the current block: If the answer is "YES", the system goes to step S154. If the answer is "NO", the system goes to step S156.

At step S154, the system records the sequence number of the current pack as the maximum sequence number, i.e., the second amount N2.

At step S156, the system determines whether the maximum sequence number N2 of the current block is known. If the answer is "YES", the system goes to step S162. If the answer is "NO", the system goes to step S164.

At step S162, the system skips all of the rest of the packs in the current block.

At step S164, the system determines whether the current pack is far from the end of the current block. This is done via comparing the pack type of the current pack with a predetermined value. If the answer is "YES", the system goes to step S166. If the answer is "NO", the system goes to step S167.

At step S167, the system sets a next provisional number via adding one to the current provisional number. Then, the system goes to step S110.

At step S166, the system skips the next three packs. Then, the system goes to step S110.

At step S126, the system determines whether the current pack is the end of the current block. This is done via checking the pack type of the current pack, since the last pack of each block is of a predetermined pack type. If the answer is "YES", the system goes to step S128. If the answer is "NO", the system goes to step S168.

At step S168, the system sets a next target sequence number via adding one to the current target sequence number. Then, the system goes to step S132.

At step S128, the system records the current sequence number of the current block as the maximum sequence number N2 of the current block.

At step S130, the system sets a next target block number via adding one to the current target block number. Then, the system goes to step S131:

At step S131, the system sets the target sequence number to "0".

At step S132, the system writes the current pack to the second memory. In the second memory, the first pack is the pack given the sequence number of "0" and the block number of "0", the second pack is the pack given a sequence number of "1" and a block number of "0", and so on. When the second memory is full, the system transfers the packs from the second memory to the host computer for further processing.

The present invention has been described through detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A method for reading text data from a musical disc in a disc drive, with the musical disc including a plurality of blocks each including a plurality of packs with each pack having a block number and a sequence number, with the disc drive having a ring buffer including a first memory and a second memory, the method including:

selecting a current block from the plurality of blocks;
setting a target pack of text data to be read;
reading the plurality of packs from the current block of the musical disc, giving each of the plurality of packs a given provisional number in sequence and writing the plurality of packs with the given provisional numbers to the first memory;
providing a target provisional number;
reading the pack according to the target provisional number from the first memory;
determining whether the pack with the target provisional number is the target pack;
writing the pack with the target provisional number to the second memory if the pack with the target provisional number is the target pack;
determining whether a maximum sequence number of the current block including the pack with the target provisional number is known if the pack with the target provisional number is not the target pack;
skipping reading of the remaining packs of the current block including the pack with the target provisional number and returning to reading the plurality of packs from the current block of the musical disc if the maximum sequence number of the current block is known; and
increasing the target provisional number by an increment and returning to reading the pack according to the target provisional number if the maximum sequence number of the current block is not known.

2. The method according to claim 1 further including determining whether the pack with the target provisional number is far from an end of the current block if the maximum sequence number is not known, wherein the increment is one if the pack with the target provisional number is not far from the end of the current block and at least two if the pack with the target provisional number is far from the end of the current block.

3. The method according to claim 1 wherein determining whether the pack with the target provisional number is the target pack comprises determining whether the pack with the target provisional number is an end of the current block, wherein if the pack with the target provisional number is not the end of the current block, determining whether the maximum sequence number of the current block is known; and
recording the sequence number of the pack with the target provisional number as the maximum sequence number of the current block in the first memory if the pack with the target provisional number is the end of the current block.

4. The method according to claim 3 further including:
determining whether to stop reading the pack according to the target provisional number, wherein if not, stopping is determined, determining whether the pack with the target provisional number is the end of the current block; and
transferring data from the second memory to a player if stopping is determined.

5. The method according to claim 4 wherein determining whether to stop searching for the target block includes:
providing a counter for calculating an amount of packs that are determined not to be the target provisional number;
setting a limit; and
determining whether the amount of packs reaches the limit.

6. The method according to claim 1 wherein setting the target pack includes:
setting a target block number; and
setting a target sequence number.

7. The method according to claim 6 wherein determining whether the pack with the target provisional number is the target pack includes:
determining whether a block number of the pack with the target provisional number is equal to the target block number; and
determining whether a sequence number of the pack with the target provisional number is equal to the target sequence number.

8. The method according to claim 1
wherein if the pack with the target provisional number is the target pack, reading a block number and a sequence number of the pack with the target provisional number; and
increasing the target provisional number by one and returning to reading the pack according to the target provisional number.

9. The method according to claim 1 wherein determining whether the pack with the target provisional number is the target pack comprises determining whether a cyclic redundancy check ("CRC") value of the pack is ok.

10. The method according to claim 1 wherein providing the target provisional number includes setting the target provisional number to "0".

11. The method according to claim 1 further including:
determining whether the pack with the target provisional number is the target pack comprises determining whether the pack with the target provisional number is an end of the current block;
recording the sequence number of the pack with the target provisional number as the maximum sequence number of the current block in the first memory if the pack with the target provisional number is the end of the current block; and
increasing the target provisional number by one and returning to reading the pack according to the target provisional number.

12. A method for reading text data from a musical disc in a disc drive, with the musical disc including a plurality of blocks each including a plurality of packs with each pack having a block number and a sequence number, with the drive disc having a ring buffer including a first memory and a second memory, the method including:

selecting a current block from the plurality of blocks;
setting a target pack of text data to be read;
reading the plurality of packs from the musical disc, giving each of the plurality of packs a given provisional number in sequence and writing the plurality of packs with the given provisional numbers to the first memory;
providing a target provisional number;
reading the pack according to the target provisional number from the first memory;
determining whether the pack with the target provisional number is the target pack;
writing the pack with the target provisional number to the second memory if the pack with the target provisional number is the target pack;

determining whether the pack with the target provisional number is far from an end of the current block if the pack with the target provisional number is not the target pack;

increasing the target provisional number by at least two and returning to reading the pack with the target provisional number from the first memory if the pack with the target provisional number is far from the end of the current block; and increasing the target provisional number by one and returning to reading the pack with the target provisional number from the first memory if the pack with the target provisional number is not far from the end of the current block.

13. The method according to claim 12 further including determining whether a maximum sequence number of the current block is known after writing the pack with the target provisional number to the second memory; and skipping reading of the remaining packs of the current block if the maximum sequence number of the current block is known, wherein determining whether the pack with the target provisional number is far from the end of the current block is taken if the maximum sequence number of the current block is not known.

* * * * *